No. 777,877. PATENTED DEC. 20, 1904.
C. ABELE.
COFFEE SCOURING AND POLISHING MACHINE.
APPLICATION FILED JAN. 20, 1904.
NO MODEL. 2 SHEETS—SHEET 1.
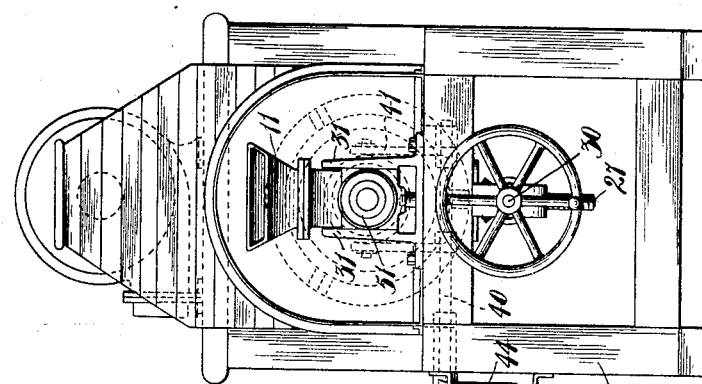
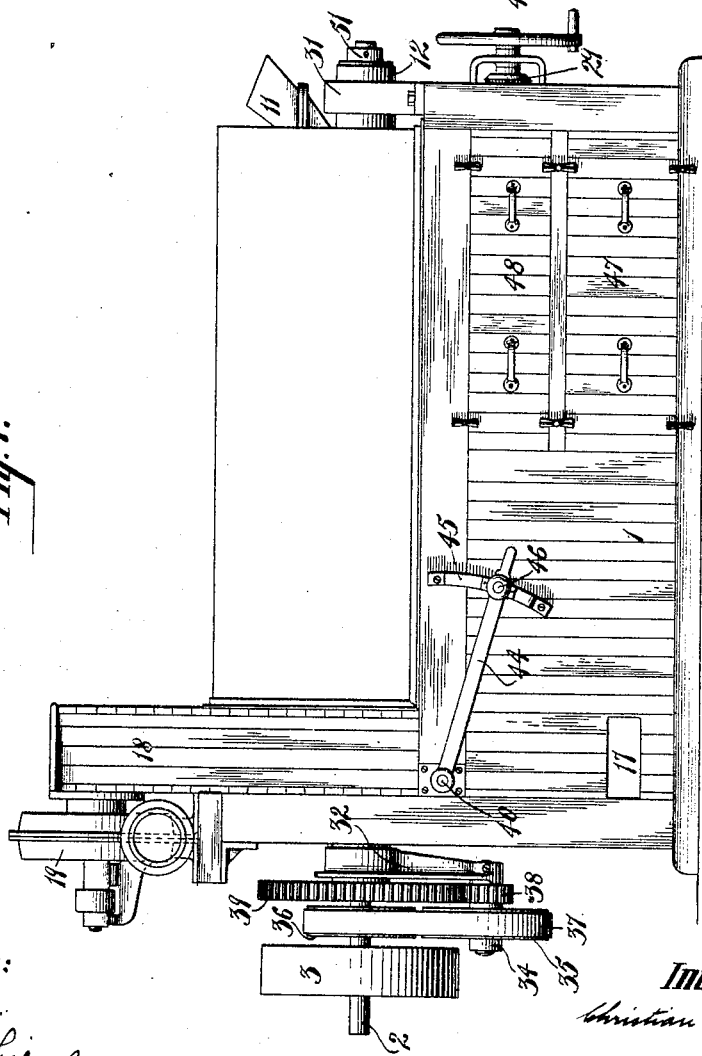

No. 777,877. PATENTED DEC. 20, 1904.
C. ABELE.
COFFEE SCOURING AND POLISHING MACHINE.
APPLICATION FILED JAN. 20, 1904.
NO MODEL. 2 SHEETS—SHEET 2.
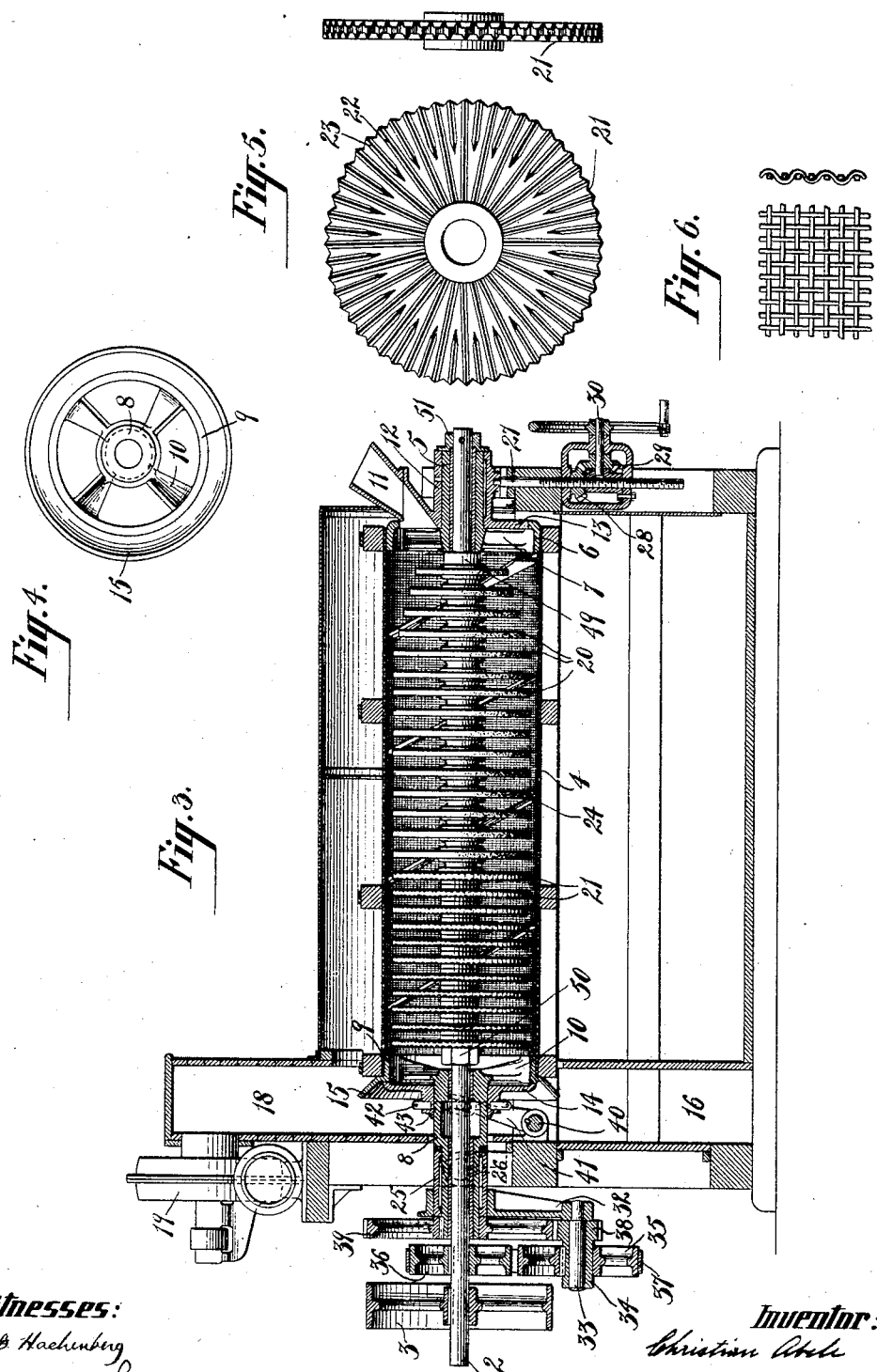

No. 777,877.

Patented December 20, 1904.

UNITED STATES PATENT OFFICE.

CHRISTIAN ABELE, OF NEW YORK, N. Y.

COFFEE SCOURING AND POLISHING MACHINE.

SPECIFICATION forming part of Letters Patent No. 777,877, dated December 20, 1904.

Application filed January 20, 1904. Serial No. 189,781.

*To all whom it may concern:*

Be it known that I, CHRISTIAN ABELE, a citizen of the United States, and a resident of the borough of Manhattan, in the city and State of New York, have invented a new and useful Improvement in Coffee Scouring and Polishing Machines, of which the following is a specification.

My invention relates to an improvement in coffee scouring and polishing machines, and has more particularly for its object to provide certain improvements in the construction, form, and arrangement of the several parts of a machine of this character whereby the green coffee-berries or other cereals which might be treated by the machine have the husk or parchment envelop removed therefrom and are cleansed of mold, dust, and other foreign material without breaking the berries.

A further object is to provide a device of the above character in which the berries are polished to a high degree, thus materially raising the grade of the product, and thereby enhancing its commercial value.

A practical embodiment of my invention is represented in the accompanying drawings, in which—

Figure 1 represents the machine in side elevation. Fig. 2 is a front end elevation of the same. Fig. 3 is a longitudinal vertical section through the machine. Fig. 4 is a detail view of one of the heads of the rotary sieve, showing the inclined spokes connecting the rim and hub of the head. Fig. 5 represents face and edge elevations of one of the polishing-disks; and Fig. 6 represents in face and cross section a portion of the sieve, on an enlarged scale, to illustrate the construction of the same.

The frame of the machine is denoted as a whole by 1, which frame is inclosed, as shown, to form a casing surrounding the operating parts of the machine other than the driving mechanism for the sieve and shaft. A shaft 2 extends longitudinally through the machine, which shaft is rotated by any suitable means. In the present instance I have represented the shaft as provided with a driving-pulley 3 exterior to the rear end of the frame 1. This shaft 2 has mounted to rotate thereon the sieve 4 as follows: The sieve 4 is provided with a front head comprising an elongated hub 5, mounted on the shaft 2, a rim 6, to which the end of the cylindical portion of the sieve is attached, and spokes 7, connecting the hub and rim. These spokes 7 are located at an angle, so as to more freely direct the berries into the interior of the sieve when the berries are being fed thereto. The sieve 4 is further provided with a rear head comprising an elongated hub 8, having an extended bearing on the shaft 2, a rim 9 to which the end of the screen portion of the sieve 4 is permanently attached, and spokes 10, connecting the said hub and rim. These spokes are also located at an angle, so as to facilitate the discharge of the berries from the interior of the sieve after they have been cleaned and polished.

The front end of the machine is provided with stationary chute 11, the inlet end of which is located exterior to the casing and the discharge end of which is located in position to discharge the berries through the openings between the spokes 7 of the front head of the sieve. In the present instance this chute 11 is carried by a sleeve 12, surrounding the hub 5 of the front head. This sleeve 12 is provided with a clamp 13, fitted to close the front end of the sieve, except at a point where the chute 11 opens into the same.

The rear or discharge end of the sieve 4 is provided with an end plate 14, loosely mounted on the hub 8 of the rear head, which plate may be moved bodily toward and away from the rear end of the sieve to regulate the discharge of the berries therefrom. The rear head may be provided with an annular outwardly-flaring flange 15 for directing the polished berries into the compartment 16 in the casing, where they may be removed through a suitable outlet 17. This discharge end of the machine is preferably provided with a flue 18, connected near its top to an exhaust-fan 19 of usual construction.

Within the sieve 4 I provide the rotary shaft 2 with a series of cleaning and polishing disks, the peripheries of which are spaced a short distance from the inner walls of the screen, the said disks being also spaced a short distance from each other along the shaft. I preferably provide the shaft 2 with abrading-disks 20—such, for instance, as emery—which disks lead from the front end of the sieve to a predetermined point toward the rear end thereof, and a series of polishing-disks 21, extending from the point where the abrading-disks leave off to the rear or discharge end of the sieve. These polishing-disks are preferably made of iron having corrugated faces and a corrugated periphery, as shown clearly in Fig. 5. The corrugated iron disks shown are provided with long radial ribs 22 alternating with short ribs 23.

The introduction of the abrading-disks for biting on the skin or foreign substance which it is desired to remove and subsequently introducing the corrugated metal disks has the following pronounced advantage—viz, that it effectually removes the undesirable part on the exterior of the berry and then agitates the berry in a manner to thoroughly shake the undesirable or foreign matter from it out through the sieve and by continuing this agitation throughout a series of corrugated disks the berry, freed entirely from the undesirable part which has been cut therefrom, is rubbed against its cleaned neighbor without any tendency to rub in the dirt or dust and the berries so agitated and rubbed against one another by the corrugated sides of the disk become highly polished and cleanly, as well as very attractive in appearance.

The interior walls of the sieve are provided with a spiral way or screw 24, leading in a direction to feed the berries from the inlet end to the discharge end as the sieve and shaft are rotated. I preferably gradually reduce the abrading-disks 20 in diameter as they approach the inlet end of the sieve and gradually increase the height of the spiral way or screw 24, as shown, for insuring a ready feed of the berries into the sieve.

The sieve and shaft are so mounted as to permit them to be raised and lowered at their forward end for the purpose of giving a greater or less cleaning action to the berries. This is accomplished as follows: The hub 8 of the rear head is mounted to rotate in a bearing-sleeve 25, pivoted to supports 26, carried at the rear end of the frame 1. At the front end of the machine the sleeve 12, within which the hub 5 of the front head is mounted, is supported upon a vertically-adjustable screw 27, carried by the frame 1, which screw is shown as having a screw-threaded engagement therewith and a bevel-gear 28, which intermeshes with a bevel-gear 29, carried by the end shaft 30. The sleeve 12 is guided in its vertical movements between uprising arms 31, fixed to the frame 1.

The sieve 4 is driven from the shaft 2 as follows. The bearing-sleeve 25 has fixed thereto an arm 32, the free end of which arm is provided with a stud-axle 33, upon which a sleeve 34 is free to rotate. This sleeve 34 has fixed thereto a band-pulley 35 in alinement with a band-pulley 36, fixed to the shaft 2, which pulleys are engaged by a common band or belt 37. The sleeve 34 is further provided with a pinion 38, which meshes with a gear 39, fixed to the hub 8 of the rear head of the sieve.

The connection between the shaft and sieve is such that the sieve is revolved in the opposite direction to the shaft at a considerably less speed than the shaft—in the present instance about one-fifth the speed of the shaft.

The means which I have shown for opening and closing the discharge-plate 14 from the exterior of the machine is arranged as follows: A cross-shaft 40 is mounted in suitable bearings at the rear end of the frame 1, which cross-shaft is provided with arms 41, the free ends of which are fitted to engage abutments 42 on the ring 43 in the hub of the plate 14. Exterior to the casing the shaft 40 is provided with a hand-lever 44, which hand-lever may be clamped in different positions upon a segment 45 by a suitable device 46.

The sieve 4 is made of the required mesh to suit the particular work to which the machine is to be used, which sieve is preferably formed from sharp square-cornered steel wire, as shown in Fig. 6. It has been found by actual tests that a sieve made up of this form produces much better results upon the berries being treated. Furthermore, the sieve is so made up that the sharp bends in the wire run lengthwise of the screen, so as to produce the effect of a great number of small abutments for engaging the berries as the machine is operated.

The casing of the machine may be provided with one or more doors 47 48 for permitting the removal of foreign matter which has been sifted through the sieve into the bottom of the casing.

In the accompanying drawings I have shown the disks 20 21 as clamped upon the shaft 2 between a collar 49 at one end of the sieve and a clamp-nut 50 at the other end of the sieve. To prevent an undue space being left between the rear polishing-disk and the rear of the sieve, I preferably cut away the spokes 10 of the back head to permit the nut 50 to extend into the plane of the said head. The front end of the shaft 2 is provided with a flanged nut or collar 51, overlapping the hub 5 and sleeve 12, for holding the several parts in their proper relation to each other.

In operation the berries to be treated are inserted into the front end of the sieve through the chute 11. As the disk and sieve are rotated the berries will be gradually fed along within the sieve to the discharge end thereof by the spiral way or screw 24. At the same time the berries will be operated upon first by the abrading-disks 20 for thoroughly cleaning them and then by the polishing-disks 21. The screen and shaft may be raised or lowered to bring the same into the desired position for producing the best results upon the particular grade of berry being treated. For instance, if the front end be lowered the material is fed more slowly toward the discharge end than if the front end should be raised, thus imparting to the material a greater amount of scouring and polishing.

The discharge-plate 14 may be opened to a greater or less extent, thus absolutely determining the amount of discharge to correspond to the amount being fed.

What I claim as my invention is—

1. A scouring and polishing machine comprising a rotary shaft, a rotary sieve, a group of scouring-disks carried by the rotary shaft within the sieve, said scouring-disks being provided with abrading-surfaces, such, for example, as emery, and a group of polishing-disks carried by the said shaft for acting upon the substance being treated after it has left the scouring-disks, the said polishing-disks having their sides corrugated whereby the substance acted upon is cleaned and subsequently agitated.

2. A scouring and polishing machine comprising a rotary shaft, a rotary sieve, disks on the shaft decreasing in diameters as they near the inlet end of the sieve and a spiral way or screw carried by the sieve increasing in height as it nears the inlet end of the sieve, whereby the material is fed along the sieve without becoming choked at its inlet end.

In testimony that I claim the foregoing as my invention I have signed my name, in presence of two witnesses, this 16th day of January, 1904.

CHRISTIAN ABELE.

Witnesses:
FREDK. HAYNES,
HENRY THIEME.